United States Patent [19]

Persson

[11] 3,916,114

[45] Oct. 28, 1975

[54] CIRCUIT IN A SUBSCRIBER'S INSTRUMENT FOR THE FEEDING OF AN OSCILLATOR

[75] Inventor: Kjell Arne Persson, Tyreso, Sweden

[73] Assignee: Telefonaktiebolaget L M Ericsson, Stockholm, Sweden

[22] Filed: Feb. 21, 1974

[21] Appl. No.: 444,419

[30] Foreign Application Priority Data

Mar. 5, 1973 Sweden ....................... 73030439

[52] U.S. Cl. ............... 179/81 R; 179/77; 179/16 F; 323/22 T

[51] Int. Cl.$^2$ ........................................ H04M 19/00

[58] Field of Search ............ 179/81 R, 84 R, 84 VF, 179/16 F, 77; 323/8, 22 T

[56] References Cited

UNITED STATES PATENTS

| | | | |
|---|---|---|---|
| 3,035,122 | 5/1962 | Livingstone | 179/16 F |
| 3,800,095 | 3/1974 | Cowpland | 179/77 |

*Primary Examiner*—Kathleen H. Claffy

*Assistant Examiner*—Joseph Popek

*Attorney, Agent, or Firm*—Hane, Baxley & Spiecens

[57] ABSTRACT

In a subscriber's telephone instrument which utilizes key-operated voice frequency RC-oscillators, a constant current circuit comprising three transistors and at least one diode, controls the operating current fed to the oscillators from the lines via which the instrument is connected to the exchange.

5 Claims, 2 Drawing Figures

CIRCUIT IN A SUBSCRIBER'S INSTRUMENT FOR THE FEEDING OF AN OSCILLATOR

The present invention relates to a circuit for the feeding of voice frequency oscillators in a subscriber's instrument which is supplied via a subscriber line. Keysenders for the sending of voice frequency signals from subscriber's instruments in telephone installations are replacing to an ever increasing extent dials, partly because increased signal possibilities are achieved, and partly because the signalling is more rapid. The demand for speed places great requirements on the voice frequency oscillators and has resulted in oscillators with circuits free from inductance, that is RC-oscillators, in which the frequency determining components consist of resistors and capacitors. The introduction of RC-circuits as frequency determining elements usually demand a greater amplification in the basic amplifier than what is demanded for corresponding LC-oscillators. The use of an amplifier with high and stable amplification demands on its part that the amplifier is supplied in such a way that the amplification is not affected appreciably by the resistance on the subscriber line.

Furthermore during signalling the oscillator circuit should show a direct current resistance, which as far as possible corresponds to the resistance of the subscriber's instrument in the speaking position, primarily because sudden current changes on the subscriber line can be mistaken for signals. Such changes are, for example, the occurrence of attenuated voice frequency oscillations on the line.

The invention solves such problems by utilizing in addition to a voltage stabilizing diode three transistors connected in a manner as disclosed in the appended claims.

Figure 1:
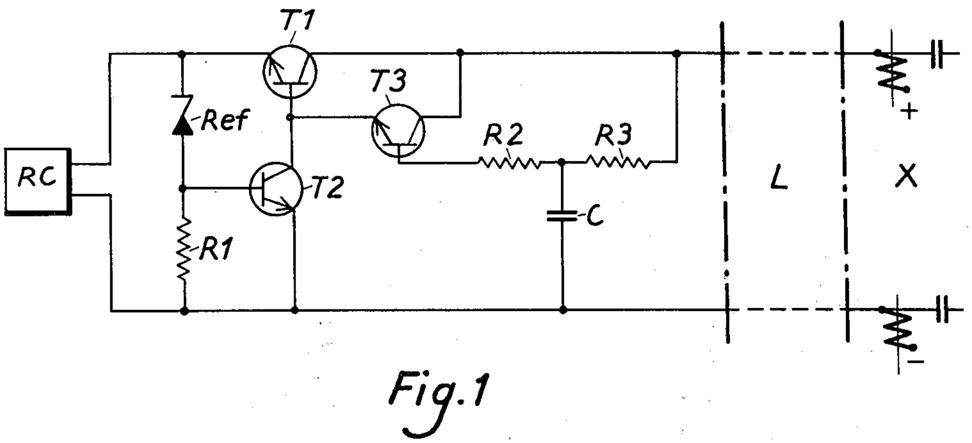
Figure 2:
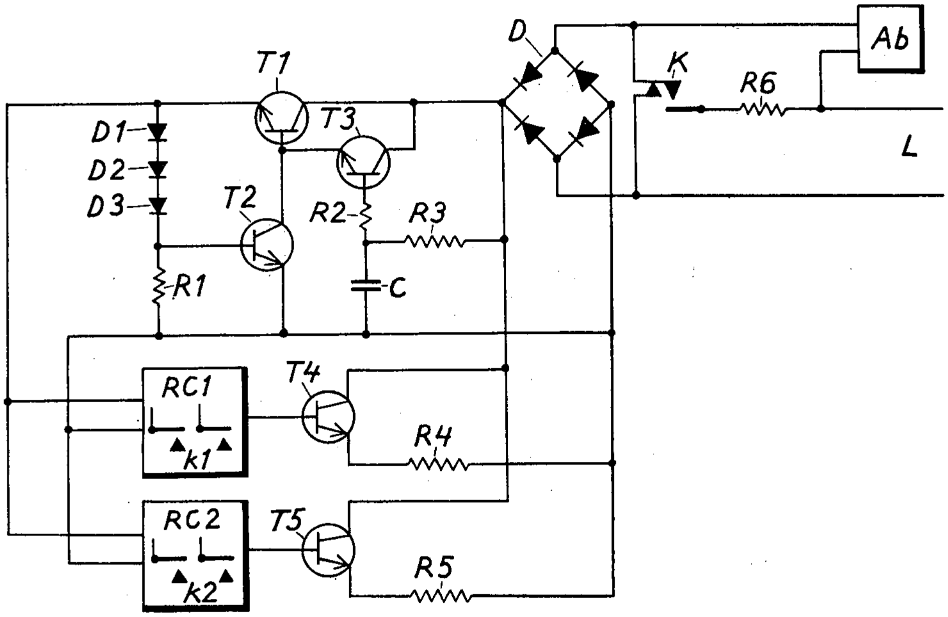

The invention will be described more in detail with reference to the accompanying drawing, wherein;

FIG. 1 shows the principle for a current feeding circuit according to the invention; and FIG. 2 shows the application of the invention to a subscriber's instrument with a key-sender for digit transmission by means of voice frequency signals.

In FIG. 1 RC is a voice frequency oscillator, which, via a current feeding circuit, is connected to a line L and which is supplied via the line from a telephone exchange X. The telephone exchange is indicated only by two feeding coils and two speech capacitors. The current feeding circuit consists of a diode, for example, a zener diode Ref, three transistors T1-T3 and three resistors R1-R3. In addition there is a filter capacitor C.

The transistors T1 and T3 receive base current in a circuit from the telephone exchange X through the upper line wire of the line L, the resistors R3, R2 and the transistors T3, T1, the oscillator RC and the circuit Ref and R1, and the lower line wire of the line. The transistor T1 is current carrying or conducting. The transistor T2 gets base current by the voltage-drop over the resistor R1 and is current carrying. Since transistor T3 is current carrying a shunt-circuit is formed between the line wires. Accordingly line L and the feeding coils in the telephone exchange are loaded, so that the voltage between the line wires decreases. The transistors T1 and T2 give a current amplification and the diode Ref stabilizes the working voltage for the oscillator RC to a value determined by the diode Ref.

For a short line L low current flows through the transistor T2. For a short line L the voltage on the current feeding circuit tends to increase. This is counteracted by the fact that the current through the transistors T3 and T2 increases causing a greater voltage-drop along the line and in the feeding coils in the telephone exchange. Thus the voltage-increase is counteracted and the current feeding circuit appears as a variable resistance, which for a short line uses more current than a constant resistance would do.

For the resistance in a carbon microphone similar conditions are valid. Since the carbon microphone is the component, which in the main determines the resistance of a conventional subscriber's instrument in the speaking position, it is understood that the current feeding circuit according to the invention will imitate a subscriber's instrument with a carbon microphone for normally occurring line resistances.

In FIG. 2 a subscriber's instrument Ab and two RC-oscillators RC1 and RC2 for the transmitting of digit signals by means of a key-sender are shown. The contacts of the senders are indicated by the designations K, k1 and k2. The oscillators are supplied from a common current feeding circuit as described in accordance with FIG. 1, and deliver voice frequency combinations. The voice frequency signal from each oscillator is fed, to the line L, via buffer transistors T4 and T5, respectively, with the emitter resistor R4, R5. In order to make the current supply to the oscillators independent of the current direction on the line L a rectifying bridge D is on the line L.

The make-before-break contact K is common for all keys in the key-sender and is affected every time a key is affected at the same time as a contact k1 and a contact k2 close frequency determining circuits in the oscillators RC1, RC2.

The zener diode Ref in FIG. 1 is replaced by three rectifiers D1-D3.

In the speaking position the current feeding circuit and the voice frequency oscillators are short-circuited by the break in the make-before-break contact K and the subscriber's instrument Ab is connected to the line L. When a digit signal is transmitted, the subscriber's instrument is at first short-circuited by means of a resistor R6 in order to let the subscriber hear that a voice frequency signal is transmitted on the line. The rectifying bridge D is connected to the line and the current supply bridge and the oscillators receive current. The oscillators RC1 and RC2 start immediately and a voice frequency combination composed of the two voice frequencies is transmitted on the line L and is received in a voice frequency receiver in the telephone exchange. In order that the alternating voltage, which the oscillators generate, not be fed back to the current feeding circuit, there is provided a low pass filter composed of the resistor R3 and the capacitor C.

We claim:

1. In a subscriber's telephone instrument connected via a two-wire line to an exchange for receiving operating current therefrom, and having at least one voice frequency oscillator with a pair of terminals, a constant current circuit for providing current to the voice frequency oscillator comprising: means for connecting one of the terminals of the oscillator to the first wire of the line, diode means connected in shunt with the terminals of the oscillator to stabilize the operating voltage of the oscillator, first, second and third transistors, each of said transistors having a base, an emitter and a collector; means for connecting the collector-emitter circuit of said first transistor between the other terminal of the oscillator and the second wire of the line; means for connecting the collector-emitter circuit of said second transistor between the base of said first transistor and said first wire; means for connecting the base of said second transistor to said diode means; means for connecting the collectoremitter circuit of said third transistor between the base of said first transistor and the second wire and means for connecting the base of said third transistor to the first wire whereby said third transistor controls the current fed to the oscillator from the line.

2. A constant current circuit for use in a subscriber's telephone instrument, said instrument including a telephone set and at least one voice frequency oscillator having a pair of operating terminals, a two-wire line having a first and a second terminal for connecting the instrument to an exchange for receiving operating current therefrom, contact means for connecting said line alternatingly to said circuit and to the telephone set for supplying operating current to the oscillator and for transmitting voice frequency signals to the line, respectively, said circuit comprising a reference voltage source connected in shunt with the terminals of the oscillator for delivering a stabilized voltage to the oscillator, a first transistor having a base, an emitter and a collector for stabilizing the current from said line to said reference voltage source, the collector-emitter path of said first transistor being connected to one terminal of the oscillator and to the first terminal of said two-wire line, a second transistor having a base, an emitter and a collector, the collector-emitter path of which being connected between the base of said first transistor and to the second terminal of said two-wire line for controlling the collector-emitter current through said first transistor, means for connecting the base of said second transistor to said reference source, the collector-emitter current through said second transistor being controlled by the current through said reference voltage source, a third transistor having a base, an emitter and a collector, means for connecting the base to said second terminal of said two-wire line, the collector-emitter path of which being connected between the first terminal of said two-wire line and the base of said first transistor, for regulating the current supplied from the two-wire line to the oscillator to conform with the current fed to said telephone set from the exchange means for connecting the other terminal of the oscillator to the second wire of the line.

3. In the subscriber's telephone instrument according to claim 2 further comprising a low-pass filter means connected to the base of said third transistor and one of the wires of the line for preventing feedback from the output to the input of the oscillator.

4. In the subscriber's telephone instrument according to claim 2 wherein the telephone set includes a carbon microphone having a given resistance, and the input impedance of said circuit as presented to the two-wire line being substantially equal to said given resistance.

5. In the subscriber's telephone instrument according to claim 2 comprising a plurality of key operated RC-oscillators each when activated oscillating at a different frequency wherein the operation of a key causes the activation of two of said RC-oscillators.

* * * * *